Dec. 26, 1961     F. C. APPL     3,014,981
COMBINED HIGH PRESSURE BUSHING AND SIGHT GLASS

Filed March 28, 1960     2 Sheets-Sheet 1

Fredric C. Appl     Inventor

By James E. Reed     Attorney

Dec. 26, 1961 F. C. APPL 3,014,981
COMBINED HIGH PRESSURE BUSHING AND SIGHT GLASS
Filed March 28, 1960 2 Sheets-Sheet 2

Fredric C. Appl    Inventor
By James E. Reed    Attorney

United States Patent Office 3,014,981
Patented Dec. 26, 1961

3,014,981
COMBINED HIGH PRESSURE BUSHING AND SIGHT GLASS
Fredric C. Appl, Manhattan, Kans., assignor to Jersey Production Research Company, a corporation of Delaware
Filed Mar. 28, 1960, Ser. No. 18,001
6 Claims. (Cl. 174—152)

The present invention relates to closures suitable for use in pressure vessels and the like and more particularly relates to an improved closure capable of withstanding higher pressures than closures available heretofore. In a preferred embodiment, the invention relates to an improved high pressure viewing port wherein the lens of the port rests upon a tapered seat and is sealed in place by means of an O-ring backed by non-extrusion rings.

Viewing ports are employed in a wide variety of industrial and scientific devices operated at extremely high pressures. In many such devices, chemical reaction vessels and diving equipment designed to operate at great depths in the ocean for example, pressure differentials across the viewing ports may be 15,000 pounds per square inch or more. Under such differential pressures, failure of the viewing ports is common. A primary reason for this lies in the fact that conventional viewing ports utilize a substantially flat disc of glass or other transparent material which is held in place between gaskets secured by bolted flanges. When the bolts holding the flanges are tightened down to secure the necessary seal around the disc, the surfaces of the glass or other material beneath the gaskets are subjected to high pressures. The resulting stresses, particularly where the bolts are tightened unevenly, cause the glass to shatter.

Various methods for overcoming this difficulty have been suggested in the past. Perhaps the most successful of these has been the use of a gasket seated on a beveled shoulder in the flange and surmounted by a retainer ring which can be tightened down against the gasket. The retainer ring forces the gasket inwardly against the edge of the disc in the port to effect the necessary seal. The pressures applied to the surfaces of the disc around its rim therefore need only be sufficient to hold the disc securely in place. Sight glasses, viewing ports and similar devices utilizing this principle have been widely used in commercial equipment. Experience has shown, however, that such devices are generally capable of withstanding pressure differentials only up to about 10,000 pounds per square inch and that they are unreliable when used under higher pressures. This is particularly true in the case of sight glasses, viewing ports and the like of relatively large diameter. In general, diameters of more than about one inch have been considered unfeasible where extremely high pressures must be utilized.

The present invention provides a new and improved closure which is capable of withstanding much higher differential pressures than closures available heretofore and can be made in considerably larger sizes than those of the prior art. In accordance with the invention, it has now been found that sight glasses, viewing ports and the like utilizing a lens or disc positioned against a tapered seat and sealed in place by means of one or more O-rings and non-extrusion rings which bear against the edge or side of the lens or disc can safely be used at pressures as high as 30,000 pounds per square inch without danger of leakage or blowout. Sight glasses and viewing ports constructed in accordance with the invention may be of larger diameter for a given pressure rating than those available in the past and hence permit a greater field of view than the conventional devices. The closures of the invention are simple in design, easily manufactured, and readily installed at relatively low cost. These advantages make them considerably more attractive from an engineering standpoint than the apparatus marketed heretofore.

The closures of the invention may be employed in a wide variety of applications. Their principal use will be in optical sight glasses and viewing ports for reaction vessels, pressure chambers, diving apparatus and similar equipment wherein objects in a high pressure area must be viewed or photographed. They may be utilized, however, with non-optically transparent discs as windows for the transmission of X-rays, gamma rays and other types of radiation into or out of a high pressure area. In some cases they may also serve as a means for conducting electrical leads to or from a high pressure chamber. These and other applications which will readily suggest themselves will be apparent to those skilled in the art upon reading the complete disclosure contained herein.

The exact nature and objects of the invention can best be understood by referring to the following detailed description of a closure embodying the principles of the invention and to the accompanying drawings, in which.

Figure 1:
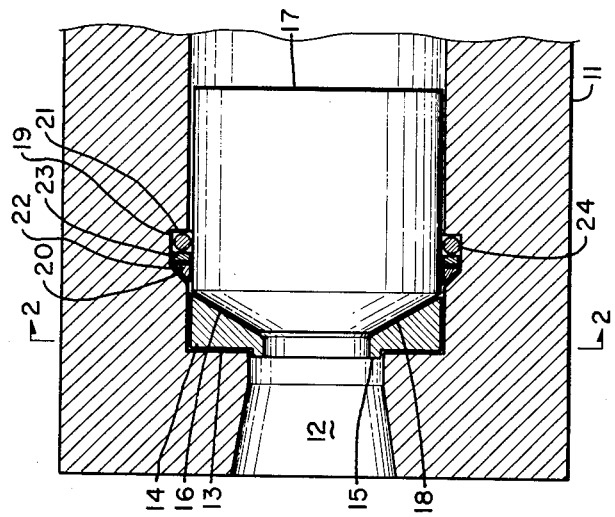
FIG. 1 is an elevational view, partially in section, through a high pressure viewing port constructed in accordance with the invention.

Turning now to FIG. 1, reference numeral 11 designates the wall of a cylindrical high pressure test chamber containing a viewing port constructed in accordance with the invention which is located in one end of the chamber. In this particular embodiment of the invention, the inner diameter of the viewing port is essentially the same as the inner diameter of the testing chamber and hence an unobstructed view of the inside of the entire chamber is possible. This is, of course, practical only in the case of relatively small diameter test chambers. In larger chambers, the viewing port will normally be located in a suitable flange welded or bolted over an opening in the chamber wall.

Viewing aperture 12 extends through wall 11 at the end of the test chamber. The diameter of the aperture will depend to some extent upon the differential pressure which the viewing port is intended to withstand but in any event will be somewhat smaller than the inner diameter of the port. The rear wall of the chamber about the aperture forms an annular shoulder 13 upon which seating ring 14 is supported. The inner diameter of the seating ring is slightly smaller than the diameter of aperture 12. An annular lip 15 on the outer face of the seating ring extends into aperture 12 and serves to center the ring with respect to the aperture. The inner face 16 of the ring slopes inwardly toward the aperture at an angle between about 30° and about 45° to a plane normal to the axis of the port.

Lens 17 is a thick disc of glass, quartz, Lucite or similar optically transparent material having a beveled edge 18 on its outer face. The angle at which the edge is beveled corresponds to the angle at which the inner face of ring 14 slopes toward the aperture. It will normally range between about 30° and about 45° to a plane normal to the axis of the lens. The lens' diameter within the beveled edge is essentially the same as the inner diameter of the seating ring. This permits the lens to seat in and be supported by the ring. The use of a tapered edge on the lens to support it in this manner reduces the shearing stresses in the lens and permits the assembly to withstand pressures above those at which conventional viewing ports fail. The lens fits closely against the inner wall within the test chamber.

The chamber wall beyond seating ring 14 contains an annular groove 19 having a beveled outer face 20 and an essentially vertical inner face 21. Outer face 20 may slope at an angle of from about 30 to about 60° with respect to the chamber wall. Non-extrusion ring 22 having a beveled outer edge is positioned within groove 19 adjacent surface 20. Flat non-extrusion ring 23 is retained in the groove next to ring 22. O-ring 24 is held between the flat ring and vertical face 21. The non-extrusion rings are preferably made of fiber, hard plastic, metal or the like. Ring 22 is split to permit its insertion into the groove. The O-ring may be made of rubber, asbestos, plastic or a similar material.

O-ring 24 fits tightly within groove 19 around lens 17 and prevents the escape of fluids through the space between the lens and the chamber wall. The non-extrusion rings support the O-ring and prevent its being compressed and forced out of position. This combination of an O-ring and non-extrusion rings permits the use of extremely high pressures within the chamber without danger of leakage or blowout of the closure.

It will be understood that the invention is not limited to the use of an optically transparent lens as described in the preceding paragraphs and may instead utilize a disc or "window" of non-transparent material for the transmission of X-rays, gamma rays or similar radiation into or out of a high pressure chamber. Many chemical reactions carried out at high pressures can be catalyzed or promoted by radiation. A reaction vessel provided with a closure of the type described herein affords a convenient means for carrying out such reactions in the presence of radiation. In like manner, the closure may be used for the X-ray study of objects under high pressures. These and similar applications for the closure will be apparent to those skilled in the art.

Figure 3:
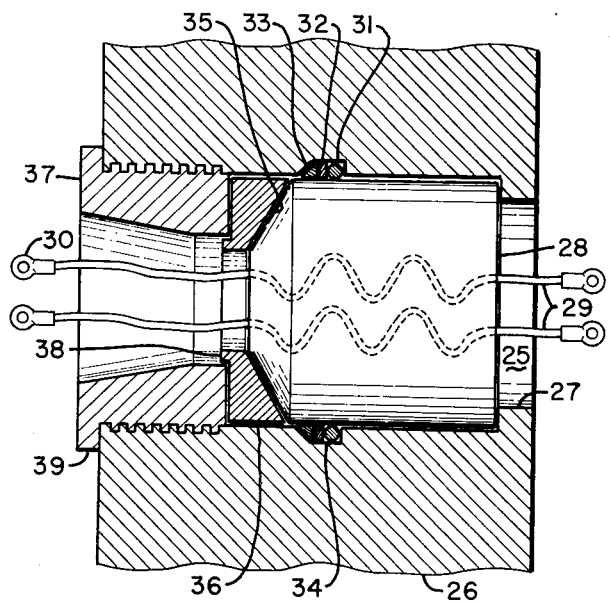
FIG. 3 is an elevation view of a further embodiment of the invention in which the closure is utilized for the passage of electrical leads into a high pressure chamber.

FIG. 3 of the drawing illustrates a modification of the invention wherein the closure is employed to conduct electrical leads into or out of a high pressure area. As shown in FIG. 3, the closure is mounted in opening 25 in plate 26, which may be the wall of a pressure chamber or may instead be a flange or the like welded, bolted or otherwise attached to the chamber wall over an opening therein. Lip 27 surrounds opening 25 on the high pressure side of the plate and serves to hold the closure assembly in place when not under pressure. Disc 28 of glass, porcelain or similar material abuts against lip 27. The disc is cast or molded about electrical leads 29 which extend through it along tortuous paths. The leads may be provided with connectors 30 to facilitate their connection into an electrical circuit. Obviously, any desired number of leads, within limitations imposed by the size of the disc, may be provided.

O-ring 31 and non-extrusion rings 32 and 33, similar to those utilized in the earlier-described embodiment, are positioned in groove 34 to effect a seal between disc 28 and the surrounding wall of opening 25. The low pressure side of the disc is provided with a tapered edge 35 which abuts against annular seating ring 36. The tapered edge of the disc and the inner face of the seating ring may make an angle of from about 30 to about 45° to a plane normal to the axis of the assembly. Electrical leads 29 pass through the central opening in the seating ring. Annular plug 37 is threaded into opening 25 against the outer face of the seating ring and holds it in place against the pressure on the high pressure side of the assembly. Lip 28 on the seating ring centers it with respect to the plug. The plug is provided with an outer flange 39 by means of which it may be turned. The leads 29 extend through the opening in the plug.

The apparatus shown in FIG. 3 provides a convenient and effective means for conducting electrical leads into and out of a high pressure chamber. Embedding of the leads in a disc of glass, porcelain or other non-conducting material obviates the difficulties normally encountered in attempting to insulate conductors under extremely high differential pressures. For a given pressure rating, the closure of the invention may be made in larger diameter than conventional closures and hence can accommodate a relatively large number of leads. There is little danger of leakage or blowout of the closure around the leads.

Figure 2:
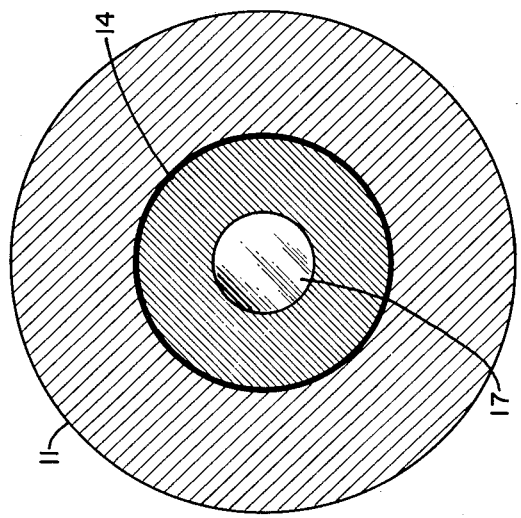
FIG. 2 is a cross-sectional view through the apparatus of FIG. 1 taken along the line 2—2.

The advantages of the closure of the invention can readily be seen by considering the results obtained when a viewing port of the type shown in FIGURES 1 and 2 of the drawing was incorporated into a high pressure test chamber designed to simulate conditions in an oil well at pressures in excess of 20,000 pounds per square inch. A Lucite lens having an outside viewing area 1⅞ inches in diameter and an inside diameter of 4 inches was utilized. The closure containing this lens was repeatedly tested at hydrostatic pressures of 30,000 pounds per square inch and was found satisfactory. It was tested at 15,000 pounds per square inch for 240 hours to determine whether there might be any long term creep effects which would affect its usefulness. The results showed a very slight amount of distortion in the Lucite, about 1/32 of an inch, but no leakage or failure occurred. By way of contrast, high pressure viewing ports of equivalent diameter designed by and secured from commercial manufacturers proved incapable of withstanding the 30,000 pounds per square inch pressures and in general were unreliable at pressures in excess of about 10,000 pounds per square inch. These results clearly demonstrate the superiority of the closures of the invention over those available heretofore.

What is claimed is:

1. A closure assembly capable of withstanding high pressure which comprises a rigid wall member having a high pressure side and a low pressure side, said wall member containing a port of circular cross-section within which an annular shoulder facing the high pressure side of said wall member and an annular groove intermediate said shoulder and said high pressure side of said wall member are located; a rigid annular seating member bearing against said shoulder in said port, the annular surface of said seating member facing said high pressure side of said wall member converging toward said low pressure side of said wall member at an angle between about 30° and about 45° to a plane normal to the axis of said port; a rigid elongated cylindrical member in said port having a beveled edge which bears upon and is coextensive with the annular converging surface of said seating member; a non-extrusion ring in said groove surrounding said cylindrical member; and a resilient seal ring in said groove which contacts said cylindrical member, the bottom of said groove, and the surface of said non-extrusion ring facing the high pressure side of said wall member.

2. An assembly as defined by claim 1 wherein said cylindrical member is optically transparent.

3. An assembly as defined by claim 1 wherein an electrical conductor embedded in said cylindrical member extends through said port.

4. An assembly as defined by claim 1 wherein said shoulder in said port is formed by an annular plug threaded into said port on the low pressure side of said wall member.

5. A viewing port assembly capable of withstanding high pressure which comprises a rigid wall member having a high pressure side and a low pressure side, said wall member containing a port of circular cross-section within which are located an annular shoulder facing the high pressure side of said wall member and an annular groove intermediate said shoulder and the high pressure side of said wall member having a sloping wall adjacent said shoulder which converges toward the low pressure side of said wall member; a rigid annular seating member bearing against said shoulder in said port, the annular surface of said seating member facing said high pressure side of said wall member converging toward said low pressure side of said wall member at an angle between about 30° and about 45° to a plane normal to the axis of said port; an elongated cylindrical lens in said port having a beveled edge which bears against and is coextensive with the annular converging surface of said seating member; a first non-extrusion ring of triangular cross-section in said groove adjacent the sloping wall thereof; a second non-extrusion ring in said groove adjacent said first ring; and a resilient seal ring in said groove which contacts the bottom of said groove, said second non-extrusion ring, and said cylindrical lens.

6. An assembly as defined by claim 5 wherein said seating member includes an annular lip which extends within said annular shoulder toward the low pressure side of said wall member.

References Cited in the file of this patent

UNITED STATES PATENTS

| | | |
|---|---|---|
| 1,129,603 | Quackenbush | Feb. 23, 1915 |
| 2,128,457 | Fairchild | Aug. 30, 1938 |
| 2,387,630 | Weakley | Oct. 23, 1945 |
| 2,427,789 | Kehle | Sept. 23, 1947 |
| 2,494,598 | Waring | Jan. 17, 1950 |
| 2,840,262 | Learmonth et al. | June 24, 1958 |